United States Patent

Long

[11] Patent Number: 5,221,934
[45] Date of Patent: Jun. 22, 1993

[54] ELECTROCHEMICAL RESISTIVE INK JET HEAD

[75] Inventor: Michael E. Long, Penfield, N.Y.

[73] Assignee: Eastman Kodak Company, Rochester, N.Y.

[21] Appl. No.: 861,665

[22] Filed: Apr. 1, 1992

[51] Int. Cl.$^5$ .................................................. B41J 2/06
[52] U.S. Cl. .................................................. 346/140 R
[58] Field of Search .................... 346/140 R, 1.1, 165, 346/150

[56] References Cited

U.S. PATENT DOCUMENTS

| | | | |
|---|---|---|---|
| 3,179,042 | 4/1965 | Nalman | 101/1 |
| 3,982,251 | 9/1976 | Hochberg | 346/1.1 |
| 4,432,003 | 2/1984 | Barbero et al. | 346/140 R |
| 4,502,054 | 2/1985 | Brescia | 346/140 R X |

OTHER PUBLICATIONS

Pimbley, W. T.; Leuco Dye System for Ink Jet Printing; IBM TDB, V23, N4, Sep. 1980, p. 1387.

Primary Examiner—Joseph W. Hartary
Attorney, Agent, or Firm—Raymond L. Owens

[57] ABSTRACT

An electrochemical resistive ink jet head is disclosed which has the capabilities to vary the color intensity of an coloring agent in an ink, eject the colored ink from the ink jet head, and deposit a colored area on a suitable receiving media.

4 Claims, 1 Drawing Sheet

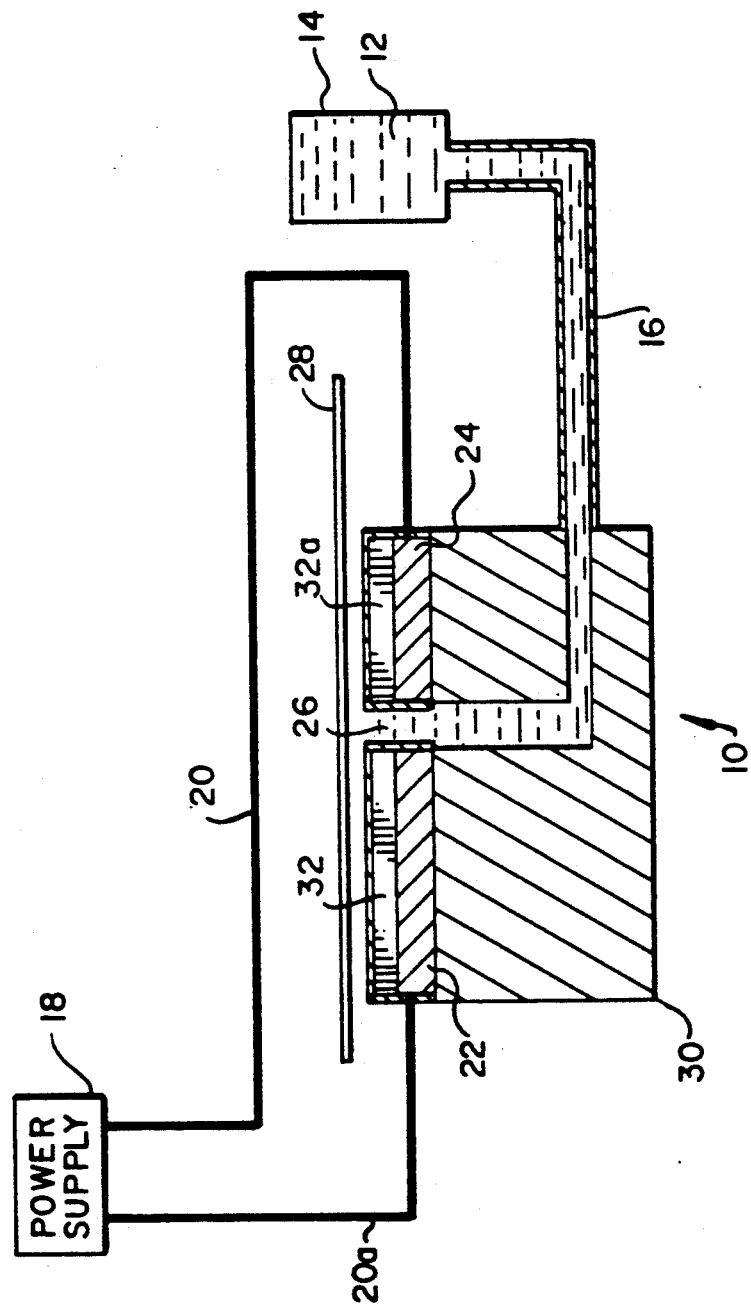

ELECTROCHEMICAL RESISTIVE INK JET HEAD

BACKGROUND OF THE INVENTION

1. Field of the Invention

The present invention relates to an ink jet printing device which can expel a drop of ink and control the color intensity of said drop.

2. Description of the Prior Art

There is known in the field an ink jet printing device wherein the liquid is kept at a predetermined level in a small tube having its free end directed upwards (U.S. Pat. No. 3,179,042). Inserted in the tube are two electrodes located on the same horizontal plane, whereby they remain submerged under an ink layer of a predetermined thickness. The ink jet is generated by an instantaneous vaporization of the portion of ink inside the tube located between the two electrodes, so as to expel the ink layer upwards.

Also known is an ink jet printing device which electrically generates an agitated condition between an electrode and a counterelectrode, which in turn causes a plurality of ink particles to be emitted through the nozzle (U.S. Pat. No. 4,432,003). Another ink jet device uses a separate piezoelectric transducer to expel the drops after they have acted upon by an electrochemical means (U.S. Pat. No. 3,982,251).

SUMMARY OF THE INVENTION

It is an object of this invention to provide an improved ink jet printing head which can place colored patterns on a receiver of varying intensities and drop sizes.

This object is achieved in an electrochemical resistive ink jet printing head which uses an ink having at least a solvent and a leuco dye or coloring agent comprising:

(a) an ink reservoir for containing such ink in preparation for printing;

(b) means defining an ink jet channel connected to the reservoir to deliver ink from the reservoir to the chamber;

(c) means defining an ink chamber for receiving ink from the channel for containing a quantity of ink for expulsion;

(d) means to deliver an electrical charge or current to ink in the ink chamber including an electrode and a counterelectrode; and potential or current across the electrode and counterelectrode to electrochemically alter composition of the leuco material contained in the ink prior to expulsion for a drop of ink from the chamber.

Features and advantages of the invention include: (1) simplicity of the head design because the means for producing a colored material and depositing said material onto the paper are one in the same, and (2) controlling the current or voltage, the amount of colored material produced and deposited on the receiver, can be varied.

BRIEF DESCRIPTION OF THE DRAWING

FIG. 1 is a block diagram which illustrates the electrochemical resistive ink jet head in accordance with the invention.

DESCRIPTION OF THE PREFERRED EMBODIMENT

FIG. 1 shows an electrochemical resistor ink jet head 10, which is supplied by ink 12, from an ink jet reservoir 14, through structure defining a supply channel 16, by either capillary action, gravity, under pressure by a mechanical pump (not shown), or other such means which is well know in the art. A gated power supply 18, provides either a controlled voltage or current through wires 20 and 20a, to electrode 22, and counterelectrode 24 and to the ink which is in a chamber 26 provided in the ink jet head base 30. The ink contains a leuco coloring agent or dye which becomes colored from electrochemical activity. The ink which is in the chamber is then electrochemically activated, ejected from the chamber due to the heat or agitation caused the electrical and electrochemical process, and is deposited on receiver 28. The electrode and counterelectrode are mounted on the ink jet head base 30, and enclosed with a cover plate 32 and 32a.

Tetrazolium salts can be used as a leuco dye in the ink jet head 10 of FIG. 1. Typical tetrazolium salts and their reduction in the FIG. 1 apparatus are illustrated below:

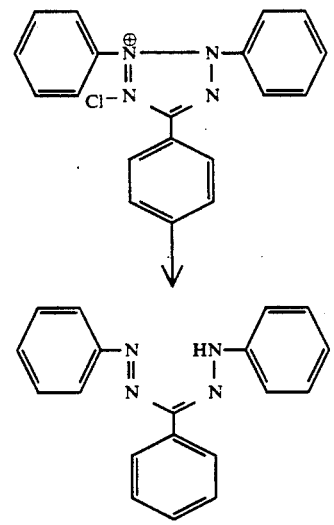

An example of such a tetrazolium compound is 2,3,5-triphenyl-2H-tetrazolium chloride.

In one example the ink was composed of 2,3,5-triphenyl-2H-tetrazolium chloride as the electrochemically active leuco coloring agent or dye in water methanol in a 2:1 ratio by volume to form a 0.05M solution. An ionic salt, such as potassium chloride could be added to control the resistance of the ink solution, but was not used in this preferred embodiment. Other materials to control bacterial growth, viscosity, drying, wetting, drop spreading, etc., as is practiced in the art could also be added.

The invention has been described in detail with particular reference to a preferred embodiment thereof, but it will be understood that variations and modifications can be effected within the spirit and scope of the invention.

I claim:

1. An electrochemical resistive ink jet printing head which uses an ink having at least a solvent and a leuco dye comprising:

(a) an ink reservoir for containing such ink in preparation for printing;

(b) means defining an ink jet channel connected to the reservoir to deliver ink from the reservoir to the chamber;

(c) means defining an ink chamber for receiving ink from the channel for containing a quantity of ink for expulsion;
(d) means disposed in the ink chamber defining an electrode and a counterelectrode; and
(e) means for creating an electrical potential or current across the electrode and counterelectrode to electrochemically activate the leuco dye contained in the ink to cause it to change color and to cause the expulsion of a colored drop of ink from said chamber.

2. The invention as set forth in claim 1 where the ink also contains an ionic salt to control the resistance of the ink solution.

3. The invention as set forth in claim 1 where the electrical potential or current is varied to change drop size and amount of dye produced.

4. The invention of claim 3 wherein the leuco dye is formed from a 2,3,5-triphenyl-2H-tetrazolium chloride salt which is reduced by the electrical charge or current.

* * * * *